Jan. 22, 1952        S. WAYTO        2,583,312
POWER SYSTEM
Filed Nov. 19, 1945
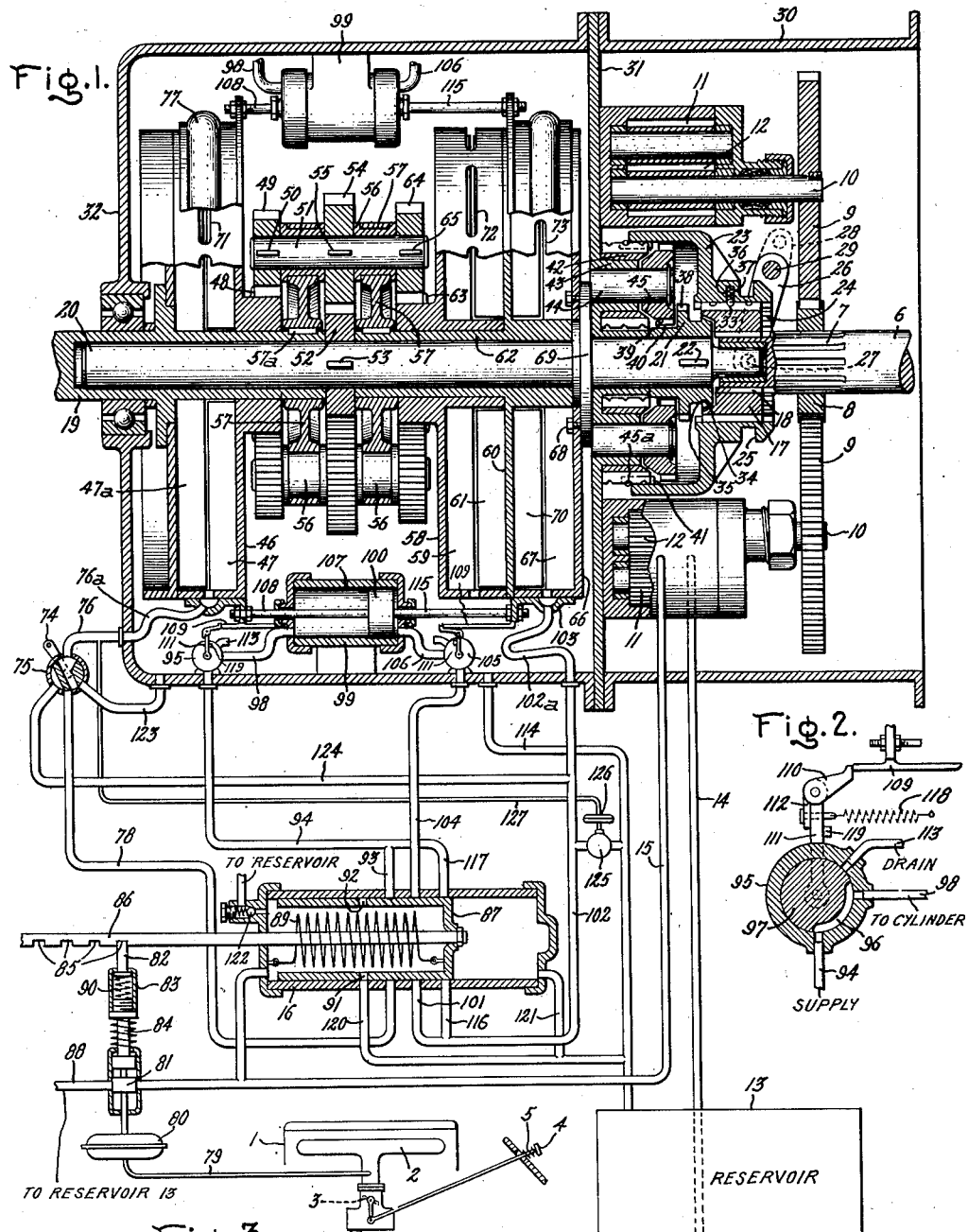
Inventor:
Stephen Wayto,
by Adolph C. Hugin
His Attorney.

Patented Jan. 22, 1952

2,583,312

UNITED STATES PATENT OFFICE 2,583,312

POWER SYSTEM

Stephen Wayto, Schenectady, N. Y.

Application November 19, 1945, Serial No. 629,370

23 Claims. (Cl. 74—688)

My invention relates to power systems and more particularly to an improved transmission in a power system in which a prime mover, such as an engine, is adapted to drive a load, such as a vehicle, through a speed changing mechanism.

Many prime movers produce substantially constant torque so that the power developed at low speeds is greatly diminished. If, therefore, it is desired to drive a load at low speed or near standstill, it is necessary to connect such prime movers to the load through a speed changing mechanism or transmission having a sufficient range of speed reduction to apply torque to the load at low speeds and to permit the prime mover to run at or within a speed range high enough to develop sufficient power to drive the load. The speed of the load at which the ratio of the speed changing mechanism should be changed varies widely depending upon the torque developed by the prime mover and the rate of acceleration of the load desired. Thus, it is desirable to coordinate the change in ratio of the speed changing mechanism with the operation of the prime mover and the load in order to obtain the maximum performance from the prime mover.

Power systems of this type are commonly used in vehicles, such as automobiles, and the conventional speed changing mechanism comprises a manually operated gear shift under the control of the vehicle operator. Under these conditions, it is not uncommon for the operator to shift from one speed ratio to another when the tractive effort of the prime mover does not correspond to the most desirable value for shifting to the next speed ratio and also the clutch which connects the transmission may not be fully disconnected, with the result that it is not uncommon to have a certain amount of clashing of the gears or a sudden retardation or abrupt acceleration of the vehicle when changing from one speed ratio to another. Even with automatic change speed mechanisms which have been developed more recently, it is necessary for the automatic mechanism to change the speed ratios and to shift gears.

An object of my invention is to provide an improved power system having a transmission which does not require a shifting of gears in order to provide different driving speed ratios between the driving and driven shafts of the system.

Another object of my invention is to provide an improved power transmission mechanism utilizing permanently connected fluid clutches in which the driven and driving parts are permanently connected to the driven and driving members respectively, and in which the different speed ratios are obtainable by selectively supplying fluid to the clutch having the desired speed change ratio between the driving and driven members.

A further object of my invention is to provide a power system having a prime mover connected to a load through a speed changing mechanism or transmission in which the ratio of the speed changing mechanism is coordinated with the speed of the prime mover and the length of time during which the load is operated at a given speed and yet to maintain control of the speed changing mechanism directly by the operator of the power system.

A still further object of my invention is to provide an improved fluid clutch system.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, Fig. 1 is a diagrammatic illustration of a power system provided with an embodiment of my invention in which parts of the transmission and control element are shown in section and parts are shown partially broken away in order to illustrate more fully certain features of my invention; Fig. 2 is an enlarged partial sectional view of a control valve for one of the fluid clutch control cylinders; and Fig. 3 is an enlarged perspective view of the rotation selector reverse clutch member latching construction.

Referring to the drawing, I have shown an embodiment of my improved power system in connection with a prime mover having a fuel control means which is also adapted to be utilized for controlling the operation of the fluid clutches in the power transmission utilized in this system. In order to provide a continuous and smooth operation of the transmission, each of a plurality of clutches is provided with a driven member permanently connected to the driven or load shaft in the system and with the driving member of the fluid clutches permanently connected by different speed ratio connecting means to a driving member. The control arrangement shown in this drawing provides for selectively supplying fluid to the clutches and providing for the draining of fluid from each of the clutches when the fluid supply is connected to supply fluid to another of the clutches, and a manual control is provided for operating the clutches in forward and reverse direction. Any suitable prime mover, such as an internal combustion engine 1 is provided having an intake manifold 2 through which a combustible mixture is supplied from a carburetor to the engine cylinders. The torque produced by the engine is controlled by opening and closing of a suitable throttle valve 3 which is operable by any suitable button or pedal 4 which is normally biased to an engine idling position by a suitable spring 5. The engine 1 is adapted to be connected to the load, which in this instance may be the driving wheels of an automobile, through a power transmission mechanism including suitable clutches and gears and is provided with a direction selector which is manually operable to a neutral position and to forward and reverse positions for driving the vehicle in forward or reverse directions and to provide a neutral position when the vehicle is not in operation. Torque is transmitted from the engine to the load through a drive shaft 6 which is supported in suitable bearings in the engine casing and which is formed with a splined end 7 on which a gear 8 is permanently mounted in driving connection therewith in any suitable manner, as by the provision of complementary splines on the gear 8 in engagement with the splined ends 7 of the drive shaft 6. This gear 8 is arranged permanently in mesh with gears 9 which are mounted in driving engagement with fluid pump drive shafts 10 of a pair of fluid gear pumps of any conventional type. These fluid pumps are adapted to provide a fluid supply pressure by the operation of the pump gears 11 and 12 which function in the conventional manner by pumping fluid, such as oil, for the fluid clutches from a fluid reservoir 13 through a connecting pipe or line 14 and supply this fluid at a desired pressure, which varies with the speed of the engine, to a main supply line or pipe 15 which connects to a selector valve cylinder 16 for supplying fluid under pressure into this cylinder as desired.

Power is adapted to be transmitted from the drive shaft 6 to the transmission through a main driving member 17 which is mounted on the engine driving shaft 6 in driving engagement therewith by a plurality of splines 18 formed on the inner surface of the member 17 and arranged in sliding engagement with the splined end 7 of the shaft 6, and the transmission mechanism is adapted to transmit power from the member 17 to a driven shaft 19. This transmission mechanism includes an intermediate shaft 20 adapted to be driven by the main driving member 17 through an intermediate member 21 which is mounted for driving engagement on the intermediate shaft 20 in any suitable manner, as by being secured thereto by a key 22.

In order to provide for a forward and reverse direction drive of the vehicle, I provide for a forward and reverse rotation of the transmission by a rotation direction selector member which includes a manually controllable axially slidable selector member 23 provided with an internal clutch 24 arranged permanently in mesh with the main driving member 17 and adapted to be operated continuously by the main driving member 17 when the engine 1 is in operation. As shown in the drawing, the direction selector member 23 is in neutral position and is disengaged from the power transmission gearing. This rotation direction selector is provided with a conventional shifting collar 25 engaged by a yoke 26 and suitable pins 27 for axially sliding the direction selector member 23 to the right and left as viewed in the drawing for reverse and forward rotation respectively. A suitable lever 28 is connected to the yoke 26 and both of these are pivoted about a suitable supporting pin 29 which is mounted in any suitable manner on the transmission casing 30. This transmission casing is provided with a supporting wall 31 which extends between the casing portion 30 and a second casing end bell portion 32 and which forms a support for the two fluid pumps and also for one end of the power transmission mechanism.

Forward operation of the vehicle is obtainable by connecting the power transmission to the engine drive shaft 6 through the rotation direction selector internal clutch 24 by shifting the selector member 23 towards the left in the drawing which first moves the main drive member 17 towards the left through the action of a latching ball 33 which latches the main drive member 17 to the direction selector member 23 until a forward friction clutch surface 34 on the main drive member 17 frictionally engages a complementary forward friction clutch surface 35 on the intermediate driving member 21. When these two friction clutch surfaces engage, the intermediate driving member 21 rotates in the same direction as the main driving member 17 and at about the same speed and further movement of the rotation direction selector member 23 towards the left causes the latching ball 33 to move upwardly into its socket 36 against the biasing action of the compression spring 37, thereby releasing the latching function of the ball 33, permitting the direction selector member 23 to move axially towards the left without further movement of the main driving member 17. The intermediate member 21 is provided with a set of forward driving clutch teeth 38 formed on the same diameter and with the size and pitch as the teeth of the main driving member 17 and of the internal clutch teeth 24 of the selector member 23, such that further movement of the member 23 towards the left engages the internal clutch teeth 24 of the direction selector member 23 with the clutch teeth 38 of the intermediate shaft driving member 21. This provides a driving connection between the intermediate driving member 21 and the main driving member 17 through the internal gear teeth 24 of the selector member 23, thereby driving the intermediate shaft 20 for forward rotation of the transmission mechanism.

Reverse operation of the power transmission mechanism is obtainable by reversing the direction of rotation of the intermediate shaft 20 from the direction of its rotation, as explained above, for forward operation of the vehicle. This reverse rotation of the intermediate shaft 20 is obtainable by driving the shaft 20 through its intermediate member 21 by a plurality of idler gears 39 arranged in engagement with gear teeth 40 on the intermediate member 21 and adapted to be driven by engagement with internal gear teeth 41 formed on the large diameter portion of the rotation direction selector member 23. In order to provide for a smooth meshing of the idler gears 40 with the teeth 41 of the member 23, I provide a reverse rotation friction clutch member 42 rotatably mounted about each of the hubs 43 which support idler gear stub shafts 44 on the casing wall 31. These reverse friction clutch members 42 are provided with friction clutch surfaces adapted to engage complementary friction clutch surfaces 45 on each of the idler gears 39 and are adapted to be shifted into driving engagement therewith by a resilient latching arrangement including a split annular spring 45a, shown in detail in Fig. 3, seated in a groove in the outer surface of the projecting ends 41a of the gear teeth 41 and adapted to be engaged in slots in teeth in the outer surface of the clutch member 42, such that when the member 23 is shifted to the right, as viewed in the drawing, the reverse friction clutch members 42 first provide an engagement with the friction clutch surfaces 45 of the idler gears 39 to drive these idler gears at substantially the same speed as the teeth 41 of the internal gear on the selector member 23, and further movement towards the right, as viewed in the drawing, of the selector member 23 provides for an unlatching by expansion of the resilient latching springs and the sliding of these springs over the clutch teeth and for a positive meshing of the idler gears 39 with the internal gear teeth 41 of the member 23. With this engagement, the main driving member 17 drives the intermediate driving member 21 through the selector member 23 and the idlers 39 and gear 40 in the reverse direction of rotation from that in which the member 21 is driven for a forward direction of rotation. This provides for driving the intermediate shaft 20 in either its forward or reverse directions of rotation and provides for driving the vehicle in either a forward or a reverse direction through the manually controlled selector mechanism.

Forward operation of a vehicle can be obtained more readily by providing for the smooth transition of the speed of operation of the driven shaft from standstill to a relatively high speed by progressively driving the driven shaft at different speed ratios from the main drive shaft as the speed of the vehicle changes. In the illustrated embodiment of my invention, this is obtained through three different speed ratios, which for convenience will be termed the low speed ratio, the second speed ratio, and the high speed ratio. All three forward speed ratios of operation are obtainable without any shifting of gears in my improved transmission mechanism. This is obtainable by the continuous permanently geared and mechanically connected connection provided between the intermediate shaft 20 and the driven shaft 19. A low speed clutch having a driven member including a fluid drum portion 46 with driving fluid clutch members or vanes 47 arranged therein is provided with a permanent driving connection with the intermediate shaft 20 through a permanently connected low speed gear 48 which is arranged in mesh with low speed nest gears 49 having mechanical driving connections through suitable keys 50 with nest gear shafts 51. It is desirable that a plurality of these nest gears should be arranged for driving the clutch gear 48, and these may be arranged at any suitably spaced angle around the shafts 19 and 20 in circumferentially spaced apart relationship. The low speed ratio clutch is provided with a driven part of any conventional design which includes vanes 47a mounted in permanently driving relation on the driven shaft 19, such that when fluid is supplied into the low speed fluid clutch, power is transmitted from the driving part including the vanes 47 to the driven part including the vanes 47a through the fluid in the clutch, as in any conventional fluid clutch construction. Driving torque is transmitted to the clutch member from the intermediate shaft 20 through a gear nest driving gear 52 which is mounted in driving engagement with the intermediate shaft 20 by any suitable means, as by being secured thereto by a key 53, and is arranged in permanently meshed driving engagement with nest shaft driving gears 54 mounted on nest shafts 51 in permanently driving relationship by being secured thereto by keys 55. The nest shafts 51 are rotatably supported by bearings 56 mounted in supporting spiders 57 which are mounted for rotation with the driven shaft 19 by being secured thereto by keys 57a. This provides for an efficient operation of the transmission mechanism without losses through any of the driving gears and also prolongs the life of the mechanism as it reduces the wear between the cooperating gear meshes.

In a similar manner, the second speed ratio for the driven shaft 19 is obtained through a second speed ratio fluid clutch which includes a driving member having a fluid drum portion 58 with driving parts or vanes 59 mounted therein and a driven part 60 having driven vane elements 61 mounted therein. This driven part 60 is permanently connected to a driven sleeve 62 arranged about the intermediate shaft 20 and permanently connected to the driven shaft 19 through the keys 57a, the spiders 57, and the nest shafts 51, so that rotation of the second speed driven part 60 drives the driven shaft 19 through the permanent unitary rotating arrangement provided by the nest gear mounting spiders 57 and the nest gear shafts 51. As in the arrangement provided for driving the low speed ratio clutch, this second speed ratio clutch driving member 58 also is permanently connected to a second speed driving gear 63 arranged in permanently meshed engagement with second speed ratio driven nest gears 64 mounted for rotation with the nest shafts 51 by permanent driving connections therewith through suitable keys 65. Thus, the driving part of the second speed ratio fluid clutch is driven at all times at the desired second speed through the second speed driven nest gears 64 whenever the intermediate shaft 20 is in operation, and torque is transmitted through this second speed ratio clutch to the driven shaft 19 by admission of fluid into the second speed ratio clutch drum 58 under the desired operating conditions.

A high speed ratio fluid clutch is provided for driving the driven shaft 19 at a high speed ratio and includes a driving part having a drum portion 66 and driving vane members 67. The drum 66 is permanently secured to the intermediate shaft 20 by suitable securing bolts 68 arranged in threaded engagement with a collar 69 formed on the intermediate shaft 20. In this manner, the driving parts of the high speed fluid clutch are directly driven and operate at the same speed as the intermediate shaft 20 whenever the shaft 20 is in operation. This high speed fluid clutch is provided with driven vane members 70 which are mounted on the driven clutch member 60 which is common to the high speed ratio clutch and to the second speed ratio clutch and which is permanently mounted on the driven sleeve 62. In this manner, under the desired operating conditions when fluid is admitted to the high speed ratio clutch drum 66, torque is transmitted from the driving part of this clutch to the driven vanes 70 and the driven part 60, such that the driven shaft 19 is operated at its high speed ratio through the transmission by the transmission of torque thereto through the nest supporting spiders 57 and the nest shafts 51, as explained with respect to the second speed ratio fluid clutch operation.

The operation of the driven shaft 19 at different speed ratios through the different fluid clutches is controlled by a selector system which delivers fluid to the three clutches as desired and provides for draining fluid from each of the clutches when fluid is being supplied to another of the clutches. In the illustrated arrangement, this system includes fluid sleeve valves adapted to connect a fluid supply to the different clutches and to provide for draining the fluid from such clutches when such clutches are adapted to turn idly and not transmit torque therethrough. Any suitable arrangement for supplying fluid into the clutches may be provided, and for purposes of illustration, I have shown an arrangement in which the fluid is supplied into the clutch drum through the outer periphery of the drums through circumferentially extending slots 71, 72, and 73 in the low speed, second speed, and high speed ratio clutch drums 46, 58, and 66, respectively.

Operation of the driven shaft 19 in a forward direction from standstill is obtained by shifting the direction selector member 23 for forward driving rotation of the intermediate shaft 20 which shifts a control valve lever 74 through a suitable linkage between the selector member 23 and lever 74 and turns it in a clockwise direction, as viewed in the figure, and positions a low speed ratio clutch control valve 75 into the position shown to provide a fluid connection between a supply line 76 having a flexible portion 76a in the casing 32 and a low speed clutch sleeve valve 77 with a fluid supply line 78, which connects with the interior of the main selector cylinder 16. By manually releasing pressure on the accelerator 4, a vacuum is created in the engine intake manifold 2, and this vacuum is transmitted through a line 79 to a diaphragm valve 80 which draws downwardly a valve 81 and a latching pin 82 through engagement of the pin head with an inturned flange on the end of a retaining cylinder 83 secured to the end of a stem 84 on the valve 81. This unlatches the pin 82 from its engagement with a notch 85 in a piston rod 86 connected to the main control selector piston 87 arranged within the selector cylinder 16. In this position of the valve 81, a differential in pressure between the pressure on the fluid as supplied by the fluid gear pump to the supply line 15 and the loss of pressure due to the exhaust of some of this fluid through the drain line 88 connected to the reservoir 13 is impressed on the under side of the selector piston 87, shown as the left side of the piston in Fig. 1, so as to move this piston towards the right, as seen in the drawing, against the tension of a tension spring 89, and the pin 82 rides up on the unnotched portion of the piston rod 86. After the lapse of a very short period of time, the accelerator 4 is again depressed to its former position, thereby removing the vacuum on the line 79 and on the diaphragm valve 80, such that the valve 81 returns to its closed position, as shown in the drawing, and full pressure of the fluid in the supply line 15 is applied to the left side of the piston 87 to move this piston towards the right, as seen in the drawing. Under this condition, the latching pin cylinder 83 is moved towards the piston rod 86, and a spring 90 biases the latching pin 82 towards the piston rod 86, such that it engages the next notch 85 in the piston rod 86 as the rod moves towards the right and prevents further movement of the piston 87. This position of the piston 87 brings an orifice 91 in the wall of the piston 87 into communication with the fluid supply line 78, such that fluid under pressure passes from the interior of the piston 87 through the supply orifice 91, the supply line 78, the valve 75, and into the supply line 76 which communicates with the low speed ratio clutch sleeve valve 77 and supplies fluid under pressure into this valve. In this position of the piston 87, another orifice 92 in the walls of the piston is brought into communication with a fluid supply line 93 connected to another fluid supply line 94 which communicates with the interior of a sleeve valve operating cylinder controlling valve having a casing 95 and shown in detail in Fig. 2. In this position, fluid is supplied from the supply line 94 into the casing 95 and through a valve passageway 96 in a valve 97 and into a cylinder supply line 98 to the interior of a sleeve valve control cylinder 99. Preferably two or more of these sleeve valve control cylinders 99 and controlling valves 97 are provided in order to equalize the operating forces on the sleeve valve 77 and to prevent binding of this sleeve valve on the low speed fluid clutch drum 46. Thus, fluid pressure is applied to the left side of a sleeve valve operating piston 100 arranged within the cylinder 99, such that this piston is biased towards the right, as viewed in the drawing, and moves the sleeve valve 77 towards the right into the position shown in the drawing. In this position of the sleeve valve 77, fluid pressure is supplied from the sleeve valve 77 to the circumferentially extending slots 71 in the fluid clutch drum 46, and fluid passes into this drum, providing the desired torque-transmitting medium through which torque is applied to the driven member clutch vanes 41a from the driving member vanes 47, as in any conventional fluid clutch, and the speed of the driven shaft 19 increases as more fluid is supplied into the low speed ratio clutch drum 46 until the speed of the vehicle reaches a value at which it is desired to operate at the second speed ratio. When this speed is attained, pressure on the accelerator 4 is released momentarily to create a vacuum in the intake manifold 2 of the prime mover 1, such that the diaphragm valve 80 again is operated in such a manner as to draw the valve 81 to its open position and thereby unlatch the latching pin 82 from its notch in the piston rod 86. As explained with respect to the low speed ratio operation, the differential pressure between that in the supply line 15 and that in the drain line 88 is applied to the under side of the selector piston 87, shown as the left side of the piston in Fig. 1, so as to move this piston towards the right against the tension of the spring 89. By again depressing the accelerator 4 to its former position, the vacuum in the intake manifold 2 is removed, and the valve 80 assumes the position shown in the drawing with the valve 81 in its closed position, such that full pressure is applied to the left side of the selector piston 87 and the latching pin cylinder 83 assumes the position in which the compression spring 90 biases the latching pin 82 towards the piston rod 86, such that the latching pin 82 will engage the next notch 85 in the piston rod 86 as the piston 87 moves towards the right in the drawing. This will latch the piston rod 86 with the latching pin 82 in the third notch from the right in the piston rod and will bring the orifice 91 in the piston 87 opposite a fluid supply line 101 connected to a fluid supply line 102 having a flexible portion 102a within the casing 32 which communicates with a second sleeve valve 103 arranged for axial sliding movement over the drum of the second speed ratio clutch and the high speed ratio clutch. This position of the selector piston 87 also brings the orifice 92 therein in communication with a supply line 104 which communicates with a control valve casing 105 constructed in the same manner as that shown in Fig. 2 and provided with a cylinder supply line 106 which communicates with the right-hand end of each of the cylinders 99. As shown in this position, pressure of the fluid within the selector cylinder 16 is applied to the right-hand side of each of the pistons 100 and biases these pistons towards the left in the drawing, which tends to exert a pressure on the fluid on the left-hand side of these pistons. This fluid within the cylinders 99 is drained out of the cylinders through a small orifice 107 in each cylinder and permits the pistons 100 to move towards the left. This movement of the pistons shifts the piston rods 108 towards the left and moves the sleeve valve 77 towards the left, thereby closing off the supply of fluid to the low speed ratio drum 46, and also moves control valve operating fingers 109 towards the left, which turns each of the valves 97 in a counterclockwise direction, as viewed in Fig. 2, through an operating crank 110 and an operating arm 111, on which the crank 110 is pivotally mounted. Crank 110 is provided with an arm 112 which prevents counterclockwise turning of the crank relative to the arm 111, as viewed in Fig. 2, such that the valve 97 turns in a counterclockwise direction and closes off the orifice in the valve casing 95 which communicates with the fluid supply line 94 and turns the valve to a position such that the fluid line 98 which communicates with the cylinder 99 communicates with a drain line 113 through the valve passageway 96. This relieves the pressure of the fluid on the left side, as seen in the drawing, of the piston 100, such that the fluid pressure on the right-hand side of this piston will move the piston towards the left in the cylinder 99 and cause the fluid in the cylinder in the left-hand side of the cylinder 99 to be exhausted into the casing 32 through the drain line 113. This fluid is drained from the casing 32 through a drain line 114 which communicates with the fluid reservoir 13 from which it again is circulated by the fluid gear pumps, as explained above. This movement of the piston 100 to its leftmost position in the cylinder 99 causes the sleeve valve 77 to be moved to the left until it uncovers the circumferentially extending slots 71 in the low speed ratio clutch drum 46, and rotation of this drum causes the fluid therein to be pumped out through these openings 71 under the action of centrifugal force into the interior of the casing 32 from which the fluid is drained, as explained above, through the drain line 114 into the reservoir 13. This position of the pistons 100 also causes right-hand piston rods 115 to be moved towards the left in the drawing, and moves the sleeve 103 towards the left, such that this valve is arranged over the second speed clutch drum 58, and the fluid pressure within the valve 103 causes fluid to pass from this valve into the second speed ratio drum 58 through the circumferentially extending openings 72 in the outer periphery thereof. This admission of fluid into the second speed ratio drum 58 causes the driving part of the drum to exert a torque on the driven part of the drum and transmits this torque to the driven shaft 19 at the second speed ratio as determined by the gears 63 and 64 and by the amount of fluid within the second speed ratio fluid clutch. As the second speed ratio fluid clutch becomes full of fluid, the torque transmitted through this clutch increases and the speed of the car also increases. When this speed has reached the desired value, the pressure on the accelerator 4 again is momentarily released, such that a vacuum again is created in the prime mover intake manifold tube and the diaphragm valve 80 again is operated to its lower position, thereby drawing the valve 81 to its open position and the latching pin 82 to its unlatched position relative to the notches in the selector piston rod 86. Under this condition, the differential in pressure between the fluid pressure in the supply line 15 and the drain line 88 again biases the selector piston 87 towards the right in the drawing against the tension in the spring 89, such that the latching pin 82 rides on the unnotched portion of the piston rod 86. When the accelerator 4 again is depressed to its former or to a desired position, the valve 80 resumes its upper position, thereby closing the valve 81 and providing full pressure of the fluid in the line 15 to the under side of the selector piston 87. This causes the selector piston 87 to move to the right until the latching pin 82 engages the last or leftmost notch in the piston rod 86 when the pin 82 is biased into this notch by the action of the compression spring 90 and prevents further movement of the piston 87. In this position of the piston 87, orifice 91 is brought into communication with a supply line 116 which communicates with the supply line 102 again to supply pressure to the sleeve valve 103. In addition, the orifice 92 in the selector piston 87 is brought into communication with a supply line 117 which communicates with the supply line 94 and the valve casing 95. In the leftmost position of travel of the piston 100, the operating finger 109 will have moved the crank 110 to such a position that the right-hand end of the finger 109 will have passed the end of the crank 110 and a tension spring 118 connected to the crank arm 112 will have biased the crank arm 112 and the valve operating arm 111 towards the right, as seen in Fig. 2, until the crank arm 111 engages a stop 119, in which position the valve passage 96 again provides communication between the cylinder line 98 and the supply line 94. Thus, when fluid pressure is applied to the supply line 117 and the supply line 94, this pressure again is supplied into the cylinders 99 on the left-hand side of the pistons 100 and biases these pistons towards the right, thereby causing the fluid on the right-hand sides of the pistons to be exhausted through the orifices 107 into the casing 32. As explained above with reference to the operation of the valves 97 on the left-hand side of each of the pistons 100, each valve 105 is turned by its operating finger 109 on the piston rod 115 so as to close off communication between the supply line 104 and the cylinder line 106 and open communication between the cylinder line 106 and a drain line 113, thereby permitting the fluid on the right-hand side of the piston 100 to be drained into the casing 32 from which it returns through the drain line 114 to the reservoir 13. Under this pressure of the fluid on the left-hand sides of the pistons 100, these pistons move towards the right in the drawing and move the valve 103 into the position shown in the drawing, such that fluid pressure in this sleeve valve 103 causes fluid to pass through the circumferentially extending openings 73 in the high speed ratio clutch drum 66 and provides for the transmission of torque from the driving part of this fluid clutch to the driven part through the vanes 67 and 70, as in any conventional fluid clutch. In addition, movement of the sleeve valve 103 towards the right in the drawing uncovers the opening 72 in the second speed ratio fluid clutch drum 58 and rotation of this drum causes the fluid therein to be exhausted through the openings 72 into the casing 32 from which it is drained back to the reservoir 13 through the drain line 114.

Should the speed of the vehicle be decreased materially for any reason or should the vehicle be brought to a stop, the operator normally would release the pressure on the accelerator 4, such that a vacuum would be created within the prime mover manifold intake 2, and the valve 80 would be operated to its lowermost position, as shown in the drawing, thereby opening the valve 81 and unlatching the pin 82 from its notches in the selector piston rod 86. If this position of the accelerator is maintained for any given length of time, the pressure on the left-hand under side of the selector piston 87 will be materially decreased due to the continued operation of the gear pumps at low speed and the draining of fluid through the valve 81, such that the tension in the spring 89 will draw the piston towards the left, as viewed in the drawing. This will cause the piston 87 to connect the orifices 91 and 92 with lower speed ratio fluid clutch valves or neutral and the valve cylinders 99 with fluid supply lines, which will cause the pistons 100 to assume the corresponding position for the supply lines to which the orifice 91 is connected until the vacuum again is released in the intake manifold 2 and the pin 82 permitted to engage one of the notches in the selector piston rod 86. If vacuum is maintained sufficiently long, the selector piston 87 will return to its leftmost position in which the orifice 91 will communicate with a drain line 120 connected to the fluid reservoir 13 through the drain line 114 and also connected through a line 121 to the other end of the selector cylinder 16 to prevent the creation of a vacuum on this side of the piston 87 and facilitate movement of the piston towards the left in the drawing. As shown, this line 121 communicates with the drain line 114 and with the fluid reservoir 13 at all times, such that pressure or vacuum on the right-hand side of the selector piston 87 is prevented by the free flow of fluid between the right-hand end of the cylinder 16 and the drain 114. If for any reason the pressure within the cylinder 16 on the left-hand side of the selector piston 87 should exceed a predetermined safe operating value, a relief valve 122 will open to provide a direct communication between this side of the cylinder 16 and the fluid reservoir 13, thereby releasing the pressure within the cylinder 16.

Reverse operation of the transmission is obtained through the same selector control mechanism as for forward operation. This reverse operation of the transmission is obtained by shifting the selector member 23 towards the right, as viewed in the drawing to provide a reverse rotation of the intermediate shaft driving member 21 through the idler gears 39. This provides for a reverse rotation of the nest gears and of all of the fluid clutches. However, since the internal gear teeth 41 provide the desired gear reduction for reverse operation by the relationship of the larger diameter of the internal gear 41 as compared to the direct drive through the clutch teeth 24 of the intermediate driving gear 21, it is desired that the intermediate shaft 20 should drive the driven shaft 19 for reverse rotation directly through the high speed ratio fluid clutch. Since reverse operation is always started from a standstill of the vehicle and a neutral position of the selector piston 87, it is only necessary to speed up the engine slightly and then momentarily release pressure on the accelerator 4 to create a momentary vacuum in the prime mover intake manifold tube so as to operate the valve 80 to its lowermost position to unlatch the latching pin 82 from the neutral right-hand notch in the selector piston rod 86, such that pressure on the under side of the selector piston 87, shown as the left side of the piston in Fig. 1, will move this piston towards the right in the drawing. When the accelerator 4 is depressed so that the vacuum in the intake manifold 2 is relieved, the pin 82 will be biased towards the selector piston rod 86 by the compression spring 90 and will engage the second notch from the right in the piston rod 86, so that the orifice 91 will communicate with the supply 78 and the orifice 92 will communicate with the supply lines 93 and 94, thereby providing fluid pressure to the left-hand side of the pistons 100 and moving the sleeve valves 77 and 103 to the positions shown in the drawing. In this position of the rotation selector member 23, the valve operating lever 74 will be moved by movement of the operating lever 28 to which it is connected, such that the valve 75 will be rotated in a counterclockwise direction to provide a communication between the fluid line 76 and a fluid drain line 123 to assure drainage of any fluid which may be in the low speed ratio fluid clutch through the line 123 into the casing 32 from which it is returned to the fluid reservoir 13 through the drain pipe 114. In this position of the valve 75, communication also is provided between the supply line 78 and a reverse supply line 124 which communicates with the fluid line 102 and through this line with the sleeve valve 103, thereby supplying fluid into the high speed ratio fluid clutch from the selector cylinder 16 and providing for the transmission of torque through this high speed ratio fluid clutch to the driven sleeve 62 to the driven shaft 19 for reverse rotation thereof. A suitably controlled pressure operated valve 125 connects with the fluid line 102 and the drain fluid line 114 to provide a communication therebetween under certain operating conditions. This valve normally remains closed for reverse operation of the transmission as the pressure responsive element 126 is biased to its closed position against pressure in a control line 127 which communicates with the line 76 connected to the sleeve valve 77 of the low speed ratio clutch. Thus, when the valve 75 is moved to its reverse position and connects the line 76 with the drain line 123, the pressure in the line 76 is not sufficient to operate the pressure responsive member 126 and the valve 125 remains closed, thereby permitting pressure of the fluid from the selector cylinder 16 to pass through the line 124 to the sleeve valve 103 through the fluid line 102. However, when it is desired to operate the vehicle in a forward direction after it has been reversed, such operation can immediately be obtained by the manual shifting of the selector member 23 to its forward position, as the valve 77 is in communication with the low speed ratio clutch opening 71, and fluid will be supplied through the valve 75 to this low speed ratio fluid clutch for driving the driven shaft 19 in its forward direction through this low speed clutch. Under this condition, it is desired that the fluid in the high speed ratio clutch should be drained, as this clutch has been filled with fluid during the reverse driving operation. Since pressure is supplied to the low speed ratio clutch through the line 76 under this condition of operation, this fluid pressure is impressed on the line 127 and to the pressure responsive valve operating member 126 so as to bias the valve 125 to its open position, thereby providing a direct communication between the fluid line 102 and the drain line 114 to the fluid reservoir 113. This provides for drainage of the fluid out of the high speed ratio fluid clutch under the centrifugal action of the vanes 67 when this clutch rotates and provides for emptying the fluid out of this clutch and for normal operation of the vehicle in a forward direction, as previously explained.

My improved power system provides for a smooth transition from standstill to desired high speed forward operation without the necessity of shifting gears either mechanically or automatically and provides for the drainage of the fluid clutch oil into the casing so that the nest gears may be continuously lubricated by oil in this casing and by the leakage of oil between the continuously rotating fluid clutch cylinders and sleeve valves. Thus, the possibility of leakage between these members is not undesirable but enhances the efficiency of operation of the illustrated construction by providing a means for splash-lubricating the gears. Furthermore, since there is no relative rotation between the nested gears for the major part of the operation of the vehicle, wear on these parts is materially reduced and the life of the equipment and its efficiency are greatly increased. In addition, since the time required to fill a fluid clutch in this system is dependent on the pressure of fluid, which depends on the speed of the prime mover and on the length of time the supply is connected to the clutch, these two factors are coordinated in determining the speed ratio of the transmission and the operation thereof is retained under the direct control of the operator of the system by the response of the selector to the operation of the fuel throttle control.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A fluid clutch having driving and driven parts, one of said parts being formed as a drum having means including a fluid passage for passage of fluid both into and out of said clutch drum through said fluid passage, a valve arranged for delivering fluid into and providing for draining fluid from said clutch drum through said fluid passage, and means for operating said valve for delivering fluid into said fluid clutch and for providing for draining fluid therefrom.

2. A fluid clutch having driving and driven parts, one of said clutch parts being formed as a drum with means for fluid admission thereinto, means for driving said clutch drum, a casing around said clutch, a fluid reservoir, means for draining clutch fluid from said casing to said reservoir, and means including a valve for supplying fluid under pressure to said fluid clutch drum from said reservoir and providing for draining fluid from said clutch drum.

3. A power system including a prime mover, a main driven member, a plurality of fluid clutches having driving members and driven members, said clutch driven members being permanently connected to said main driven member, means for continuously driving said clutch driving members at different speed ratios from said prime mover, and means for selectively supplying fluid to said fluid clutches and providing for draining fluid from each of said clutches when said fluid supply is connected for supplying fluid to other of said clutches, said last mentioned means including a valve for delivering fluid to said clutches and for providing for draining fluid from said clutches.

4. A power transmission mechanism including a driving shaft, a driven shaft, a plurality of fluid clutches having driving and driven parts with said driven parts thereof secured for rotation with said driven shaft and said driving parts thereof formed as drums with means for fluid admission thereinto, means for driving said clutch drums at different relative speed ratios from said driving shaft, and means for selectively supplying fluid to said fluid clutches and providing for draining fluid from each of said clutches when said fluid supply is connected for supplying fluid to others of said clutches, said last mentioned means including a valve for delivering fluid to said clutches and for providing for draining fluid from said clutches.

5. A power transmission including a main driving member, a main driven member, a plurality of fluid clutches having driven members permanently mechanically connected to said main driven member and driving members connected to said main driving member through different speed ratio connecting members for simultaneously driving said clutch driving members at different relative speeds, and means for selectively supplying fluid to said fluid clutches and for draining fluid from each of said clutches when said fluid supply is connected for supplying fluid to other of said clutches, said last mentioned means including a valve for delivering fluid to said clutches and for providing for draining fluid from said clutches.

6. A power system including a prime mover having a fuel control means for regulating the operation of said prime mover, a main driven member, a plurality of fluid clutches having driving members and driven members, said clutch driven members being permanently connected to said main driven member, means for continuously driving said clutch driving members at different speed ratios from said prime mover, and clutch control means responsive to regulation of the operation of said prime mover by said fuel control means for selectively supplying fluid to said fluid clutches and providing for draining fluid from each of said clutches when said fluid supply is connected for supplying fluid to other of said clutches, said clutch control means including a valve for delivering fluid to said clutches and for providing for draining fluid from said clutches.

7. A power transmission mechanism including a main driving gear, a driven shaft, a rotatably mounted intermediate shaft, a plurality of rotatably mounted idler gears, an intermediate shaft driving gear mounted on said intermediate shaft for driving rotation therewith and engaged with said idler gears, means including a shiftable member having a part arranged in axially slidable engagement with said main driving gear for selectively driving said intermediate shaft through connections with said idler gears and said intermediate gear, a plurality of fluid clutches having driving and driven parts with said driven parts thereof secured for rotation with said driven shaft and said driving parts thereof formed as drums with means for fluid admission thereinto, means for driving said clutch drums at different relative speed ratios from said intermediate shaft, and means for selectively supplying fluid to said fluid clutches and providing for draining fluid from each of said clutches when said fluid supply is connected for supplying fluid to another of said clutches.

8. A power transmission mechanism including a drive shaft, a driven shaft, a plurality of fluid clutches having driving and driven parts with said driven parts thereof secured for rotation with said driven shaft, said fluid clutches being formed for admitting fluid into and for draining fluid from said clutches, means for driving said clutch driving parts at different relative speed ratios including a gear nest driving gear, a plurality of nested gear supporting shafts mounted for rotation with said driven shaft, a nest shaft driving gear mounted for rotation with each of said nest shafts and arranged in geared driving engagement with said gear nest driving gear, a low speed driven nest gear mounted for rotation with each of said nest shafts and arranged for driving engagement with one of said clutches, a second speed driven nest gear mounted for rotation with each of said nest shafts arranged for driving engagement with a second of said clutches, and means for selectively supplying fluid to said fluid clutches and for draining fluid from each of said clutches when said fluid supply is connected for supplying fluid to another of said clutches.

9. A power transmission mechanism including a casing and having a drive shaft, a plurality of fluid clutches arranged within said casing and having driving and driven parts with said driven parts thereof secured for rotation with said driven shaft and said driving parts thereof formed as drums with means for fluid admission into said clutches, means for driving said clutch drums at different relative speed ratios including a gear nest driving gear, a plurality of nested gear supporting shafts mounted for rotation with said driven shaft, a nest shaft driving gear mounted for rotation with each of said nest shafts and arranged in geared driving engagement with said nest driving gear, a low speed driven nest gear mounted for rotation with each of said nest shafts and arranged for driving a low speed clutch of said clutches, a second speed driven nest gear mounted for rotation with each of said nest shafts arranged for driving a second speed clutch of said clutches, and means for selectively supplying fluid to said fluid clutches and for draining fluid from each of said clutches when said fluid supply is connected for supplying fluid to another of said clutches.

10. A power system including a prime mover having a drive shaft, a driven shaft, a low speed fluid clutch having driving and driven parts with said driven part thereof permanently connected for rotation with said driven shaft and said driving part thereof formed as a drum, a second speed fluid clutch having driving and driven parts with said driven part thereof permanently connected for rotation with said driven shaft and said driving part thereof formed as a drum, a high speed fluid clutch having driving and driven parts with said driven part thereof permanently connected for rotation with said driven shaft and said driving part thereof formed as a drum, means for driving said clutch drums at different relative speed ratios from said drive shaft, each of said clutches having means for passage of fluid into and out of said clutch drum, a valve arranged for controlling the flow of fluid into and out of said low speed clutch drum, a second valve arranged for controlling the flow of fluid into and out of said second and high speed clutch drums, means for operating said valves for selectively supplying fluid into one of said fluid clutches and providing for draining fluid from each of said clutches when said fluid supply is connected for supplying fluid to another of said clutches.

11. A power transmission mechanism including a main driving gear, a driven shaft, an intermediate shaft, an intermediate shaft driving gear mounted on said intermediate shaft for driving rotation therewith, means including a shiftable gear rotation selector member having a part arranged in axially slidable engagement with said main driving gear for selectively driving said intermediate shaft through connections with said intermediate driving gear, means including three fluid clutches each having driving and driven parts with said driven part thereof secured for rotation with said driven shaft and said driving part thereof formed as a drum with means for fluid admission thereinto for transmitting power from said intermediate shaft to said driven shaft at three different speed ratios, the two lower speed ratio clutches having different gear ratio clutch drum gears secured for rotation with said clutch drums, said highest speed ratio clutch drum having a direct mechanical driving connection with said intermediate shaft, means for driving said fluid clutch gears by said intermediate shaft, and means for selectively supplying fluid to said three fluid clutches and for draining fluid from each of said clutches when said fluid supply is connected for supplying fluid to another of said clutches.

12. A power system including a prime mover having a drive shaft, a driven shaft, a rotatably mounted intermediate shaft, means for selectively driving said intermediate shaft from said drive shaft, a low speed fluid clutch having driving and driven parts with said driven part thereof permanently connected for rotation with said driven shaft and said driving part thereof formed as a drum, a second speed fluid clutch having driving and driven parts with said driven part thereof permanently connected for rotation with said driven shaft and said driving part thereof formed as a drum, a high speed fluid clutch having driving and driven parts with said driven part thereof permanently connected for rotation with said driven shaft and said driving part thereof formed as a drum, means for driving said clutch drums at different relative speed ratios from said intermediate shaft, each of said clutches having means for passage of fluid into and out of said clutch drums, a valve arranged for controlling the flow of fluid into and out of said low speed clutch drum, a second valve arranged for controlling the flow of fluid into and out of said second and high speed clutch drums, means for operating said valves for selectively supplying fluid into one of said fluid clutches and providing for draining fluid from each of said clutches when said fluid supply is connected for supplying fluid to another of said clutches.

13. A power system including a prime mover having a drive shaft, a driven shaft, a low speed fluid clutch having driving and driven parts with said driven part thereof permanently connected for rotation with said driven shaft and said driving part thereof formed as a drum, a second speed fluid clutch having driving and driven parts with said driven part thereof permanently connected for rotation with said driven shaft and said driving part thereof formed as a drum, a high speed fluid clutch having driving and driven parts with said driven part thereof permanently connected for rotation with said driven shaft and said driving part thereof formed as a drum, means for driving said clutch drums at different relative speed ratios from said drive shaft, each of said clutches having means for passage of fluid into and out of said clutch drums, a valve arranged for controlling the flow of fluid into and out of said low speed clutch drum, a second valve arranged for controlling the flow of fluid into and out of said second and high speed clutch drums, means including a cylinder and a piston for operating said valves, and means including a selector having a cylinder and piston therein for selectively supplying fluid to said fluid sleeve valves and to said sleeve valve operating cylinder for operating said sleeve valves to supply fluid to the sleeve valve operated into position for supplying fluid into a fluid clutch and providing for draining fluid from each of said clutches when said fluid supply is connected for supplying fluid to another of said clutches.

14. A power system including a prime mover having a fuel control means and a drive shaft, a driven shaft, a rotatably mounted intermediate shaft, means for selectively driving said intermediate shaft from said drive shaft, a low speed fluid clutch having driving and driven parts with said driven part thereof connected for rotation with said driven shaft and said driving part thereof formed as a drum, a second speed fluid clutch having driving and driven parts with said driven part thereof connected for rotation with said driven shaft and said driving part thereof formed as a drum, a high speed fluid clutch having driving and driven parts with said driven part thereof connected for rotation with said driven shaft and said driving part thereof formed as a drum, means for driving said clutch drums at different relative speed ratios from said intermediate shaft, each of said clutch drums having circumfrerentially extending slots therein for passage of fluid between the inside and exterior of said drums, a sleeve valve arranged for axial movement over said low speed clutch drum, a second sleeve valve arranged for axial movement over said second and high speed clutch drums, means including a cylinder and a piston for operating said sleeve valves for communication with and for uncovering said drum slots, means including a selector having a cylinder and piston therein for selectively supplying fluid to said fluid sleeve valves and to said sleeve valve operating cylinder for operating said sleeve valves to supply fluid to the sleeve valve operated into position for supplying fluid into a fluid clutch and providing for draining fluid from each of said clutches when said fluid supply is connected for supplying fluid to another of said clutches, and means responsive to said fuel control means for controlling the operation of said selector piston.

15. A power system including a prime mover having a fuel control means and a drive shaft, a driven shaft, a rotatably mounted intermediate shaft, means for selectively driving said intermediate shaft from said drive shaft, a low speed fluid clutch having driving and driven parts with said driven part thereof permanently connected for rotation with said driven shaft and said driving part thereof formed as a drum, a second speed fluid clutch having driving and driven parts with said driven part thereof permanently connected for rotation with said driven shaft and said driving part thereof formed as a drum, a high speed fluid clutch having driving and driven parts with said driven part thereof permanently connected for rotation with said driven shaft and said driving part thereof formed as a drum, means for driving said clutch drums at different relative speed ratios from said intermediate shaft, each of said clutches having means for passage of fluid into and out of said clutch drums, a valve arranged for controlling the flow of fluid into and out of said low speed clutch drum, a second valve arranged for controlling the flow of fluid into and out of said second and high speed clutch drums, means including a cylinder and a piston for operating said valves, means including a selector having a cylinder and piston therein for selectively supplying fluid to said fluid valves and to said valve operating cylinder for operating said valves to supply fluid to the valve operated into position for supplying fluid into a fluid clutch and providing for draining fluid from each of said clutches when said fluid supply is connected for supplying fluid to another of said clutches, and means responsive to said fuel control means for controlling the operation of said selector piston.

16. A power transmission mechanism including a drive shaft, a main driving gear having an axially slidable driving engagement with said drive shaft, a driven shaft, an intermediate shaft, an intermediate shaft driving gear mounted on said intermediate shaft for driving rotation therewith, means including a shiftable member having a part arranged in axially slidable engagement with said main driving gear for selectively driving said intermediate shaft through said intermediate driving gear, a low speed fluid clutch having driving and driven parts with said driven part thereof secured for rotation with said driven shaft and said driving part thereof formed as a drum with means for fluid admission thereinto and with a low speed clutch drum gear secured for rotation therewith, a second speed fluid clutch having driving and driven parts with said driven part thereof secured for rotation with said driven shaft and said driving part thereof formed as a drum with means for fluid admission thereinto and with a second speed clutch drum gear secured for rotation therewith, a high speed fluid clutch having driving and driven parts with said driven part thereof secured for rotation with said driven shaft and said driving part thereof formed as a drum with means for fluid admission thereinto and with a direct mechanical driving connection with said intermediate shaft, means for driving said fluid clutch gears by said intermediate shaft, and means for selectively supplying fluid to said three fluid clutches and for draining fluid from each of said clutches when said fluid supply is connected for supplying fluid to another of said clutches, said selective fluid supply being operable in response to vacuum pressure of the fuel supply to the prime mover for said power transmission as controlled by the throttle position thereof.

17. A power transmission mechanism including a drive shaft, a driven shaft, a rotatably mounted intermediate shaft, means for driving said intermediate shaft by said drive shaft, a low speed fluid clutch having driving and driven parts with said driven part thereof secured for rotation with said driven shaft and said driving part having a low speed clutch gear secured for rotation therewith, a driven sleeve member rotatably mounted on said intermediate shaft, a second speed fluid clutch having driving and driven parts with said driven part thereof secured for rotation with said driven sleeve member and said driving part thereof having a second speed clutch gear secured for rotation therewith, a high speed fluid clutch having driving and driven parts with said driven part thereof secured for rotation with said driven sleeve member and said driving part thereof having a direct mechanical driving connection with said intermediate shaft, a gear nest driving gear mounted on said intermediate shaft between said low speed clutch and said sleeve member for rotation with said intermediate shaft, a nested gear supporting shaft mounted for rotation with said driven shaft and with said driven sleeve member forming a driving connection therebetween, a nest shaft driving gear mounted for rotation with said nest shaft and arranged in geared driving engagement with said nest driving gear, a low speed driven nest gear mounted for rotation with said nest shaft and arranged in driving engagement with said low speed clutch driving gear, a second speed driven nest gear mounted for rotation with said nest shaft arranged in driving engagement with said second speed clutch driving gear, and means for selectviely providing for the transmission of torque through said three clutches and for removing the driving connection between the driving and driven clutch parts from each of said clutches when another of said clutches is operated to transmit torque therethrough.

18. A power transmission mechanism including a main driving gear, a driven shaft, a rotatably mounted intermediate shaft, a plurality of rotatably mounted idler gears, an intermediate shaft driving gear mounted on said intermediate shaft for driving rotation therewith and having a permanently geared engagement with said idler gears, a gear portion on said intermediate driving gear of the same diameter and gear pitch as said main driving gear, means including a shiftable member having a part arranged in axially slidable engagement with said main driving gear and intermediate driving gear and another part adapted to provide a driving engagement with said idler gears for selectively driving said intermediate shaft by engagement with said intermediate driving gear and said idler gears, a forward friction clutch member on said intermediate driving gear, a second forward friction clutch member on said main driving gear, a third friction clutch member on said idler gears, a fourth friction clutch member for said shiftable member, means including a shifter member for manually shifting said shiftable member for forward drive to provide a driving engagement first between said forward friction clutch members to drive said intermediate driving gear for forward drives and subsequently to provide a direct mechanical driving engagement between said main and intermediate driving gears through said shiftable member for forward drive of said intermediate shaft and alternately to provide a driving engagement first between said third and fourth friction clutch members to drive said intermediate driving gear through said idlers and subsequently to provide a mechanical drive between said main and intermediate driving gears through a gear reduction by engagement of said shiftable member and idler gears, a plurality of fluid clutches having driving and driven parts with said driven part thereof secured for rotation with said driven shaft and said driving part thereof formed as a drum with means for fluid admission passages thereinto, means for driving said clutch driving members at different relative speed ratios from said intermediate shaft, means including sleeve valves for selectively admitting fluid to said three fluid clutches and means arranged for draining fluid from each of said clutches when said fluid supply is connected for supplying fluid to another of said clutches.

19. A power transmission mechanism including a main driving gear, a driven shaft, a rotatably mounted intermediate shaft, a casing around said power transmission mechanism, a plurality of idler gears rotatably mounted on said casing, an intermediate shaft driving gear mounted on said intermediate shaft for driving rotation therewith and having a permanently geared engagement with said idler gears, a gear portion on said intermediate driving gear of the same diameter and gear pitch as said main driving gear, means including a shiftable member having a part arranged in axially slidable engagement with said main driving gear adapted for driving engagement with said intermediate driving gear and another part adapted to provide a driving engagement with said idler gears for selectively driving said intermediate shaft by engagement with said intermediate driving gear and said idler gears, a forward friction clutch member on said intermediate driving gear, a second forward friction clutch member on said main driving gear, a third friction clutch member on said idlers, a fourth friction clutch member for said shiftable member, means including a shifter member for manually shifting said shiftable member for forward drive to provide a driving engagement first between said forward friction clutch members to drive said intermediate driving gear for forward drives and subsequently to provide a direct mechanical driving engagement between said main and intermediate driving gears through said shiftable member for forward drive of said intermediate shaft and alternately to provide a driving engagement first between said third and fourth friction clutch members to drive said intermediate driving gear through said idlers and subsequently to provide a mechanical drive between said main and intermediate driving gears through a gear reduction by engagement of said shiftable member and idler gears for drive of said intermediate shaft, a plurality of fluid clutches having driving and driven parts with said driven part thereof secured for rotation with said driven shaft and said driving part thereof formed as a drum with means for fluid admission thereinto, means for driving said clutch drums at different relative speed ratios from said intermediate shaft, and means for selectively supplying fluid to said three fluid clutches and for draining fluid from each of said clutches when said fluid supply is connected for supplying fluid to another of said clutches.

20. A power transmission mechanism including a drive shaft, a main driving gear having an axially slidable driving engagement with said drive shaft, a driven shaft, an intermediate shaft rotatably mounted on said drive and driven shafts, a casing around said power transmission mechanism, a plurality of idler gears rotatably mounted on said casing, a intermediate shaft driving gear mounted on said intermediate shaft for driving rotation therewith, means including a shiftable member having a part arranged in axially slidable engagement with said main driving gear for selectively driving said intermediate shaft through said intermediate gear, a low speed fluid clutch having driving and driven parts with said driven part thereof secured for rotation with said driven shaft and said driving part thereof formed as a drum with means for fluid admission thereinto and with a low speed clutch drum gear secured for rotation therewith, a second speed fluid clutch having driving and driven parts with said driven part thereof secured for rotation with said driven shaft and said driving part thereof formed as a drum with means for fluid admission thereinto and with a second speed clutch drum gear secured for rotation therewith, a high speed fluid clutch having driving and driven parts with said driven part thereof secured for rotation with said driven shaft and said driving part thereof formed as a drum with means for fluid admission thereinto and with a direct mechanical driving connection with said intermediate shaft, a gear nest driving gear mounted on said intermediate shaft for rotation therewith, a plurality of nested gear supporting shafts mounted for rotation with said driven shaft, a nest shaft driving gear mounted for rotation with each of said nest shafts and arranged in geared driving engagement with said nest driving gear, a low speed driven nest gear mounted for rotation with each of said nest shafts and arranged in driving engagement with said low speed clutch driving gear, a second speed driven nest gear mounted for rotation with each of said nest shafts arranged in driving engagement with said second speed clutch driving gear, and means for selectively supplying fluid to said three fluid clutches and for draining fluid from each of said clutches when said fluid supply is connected for supplying fluid to another of said clutches, said selective fluid supply being operable in response to vacuum pressure of the fuel supply to the prime mover for said power transmission as controlled by the throttle position thereof.

21. A power transmission mechanism including a drive shaft having a splined end, a main driving gear having an axially slidable splined engagement with said shaft splined end, a driven shaft, an intermediate shaft rotatably mounted on said drive and driven shafts, a casing around said power transmission mechanism, a plurality of idler gears rotatably mounted on said casing, an intermediate shaft driving gear mounted on said intermediate shaft for driving rotation therewith and having a permanently geared engagement with said idler gears, a gear portion on said intermediate driving gear of the same diameter and gear pitch as said main driving gear, means including a shiftable member having a part arranged in axially slidable engagement with said main driving gear and another part adapted to provide a driving engagement with said idler gears for selectively driving said intermediate shaft by engagement with said intermediate driving gear and said idler gears, a forward friction clutch member on said intermediate driving gear, a second forward friction clutch member on said main driving gear, a third clutch member on said idler gears, a fourth clutch member for said shiftable member, means including a shifter member for manually shifting said shiftable member for forward drive to provide a driving engagement first between said forward friction clutch members to drive said intermediate driving gear for forward drives and subsequently to provide a direct mechanical driving engagement between said main and intermediate driving gears through said shiftable member for forward drive of said intermediate shaft and alternately to provide a driving engagement first between said third and fourth friction clutch members to drive said intermediate driving gear through said idlers for reverse drive and subsequently to provide a mechanical drive between said main and intermediate driving gears through a gear reduction by engagement of said selector gear member and idler gears for drive of said intermediate shaft, a low speed fluid clutch having driving and driven parts with said driven part thereof secured for rotation with said driven shaft and said driving part thereof formed as a drum with means for fluid admission thereinto and with a low speed clutch drum gear secured for rotation therewith, a second speed fluid clutch having driving and driven parts with said driven part thereof secured for rotation with said driven shaft and said driving part thereof formed as a drum with means for fluid admission thereinto and with a second speed clutch drum gear secured for rotation therewith, a high speed fluid clutch having driving and driven parts with said driven part thereof secured for rotation with said driven shaft and said driving part thereof formed as a drum with means for fluid admission thereinto and with a direct mechanical driving connection with said intermediate shaft, means for driving said fluid clutch gears by said intermediate shaft, and means for selectively supplying fluid to said three fluid clutches and for draining fluid from each of said clutches when said fluid supply is connected for supplying fluid to another of said clutches.

22. A power transmission mechanism including a drive shaft, a main driving gear having an axially slidable driving engagement with said drive shaft, a driven shaft, an intermediate shaft rotatably mounted on said drive and driven shafts, a casing around said power transmission mechanism, a plurality of idler gears rotatably mounted on said casing, an intermediate shaft driving gear mounted on said intermediate shaft for driving rotation therewith and having a permanently geared engagement with said idler gears, a gear portion on said intermediate driving gear of the same diameter and gear pitch as said main driving gear, means including a shiftable member having a part arranged in axially slidable engagement with said main driving gear and intermediate driving gear and another part adapted to provide a driving engagement with said idler gears for selectively driving said intermediate shaft by engagement with said intermediate driving gear and said idler gears, a forward friction clutch member on said intermediate driving gear, a second forward friction clutch member on said main driving gear, a third friction clutch member on said idler gears, a fourth friction clutch member for said shiftable member, means including a shifter member for manually shifting said shiftable member for forward drive to provide a driving engagement first between said forward friction clutch members to drive said intermediate driving gear for forward drives and subsequently to provide a direct mechanical driving engagement between said main and intermediate driving gears through said shiftable member for forward drive of said intermediate shaft and alternately to provide a driving engagement first between said third and fourth friction clutch members to drive said intermediate driving gear through said idlers and subsequently to provide a mechanical drive between said main and intermediate driving gears through a gear reduction by engagement of said shiftable member and idler gears, a low speed fluid clutch having driving and driven parts with said driven part thereof secured for rotation with said driven shaft and said driving part thereof formed as a drum with means for fluid admission thereinto and with a low speed clutch drum gear secured for rotation therewith, a second speed fluid clutch having driving and driven parts with said driven part thereof secured for rotation with said driven shaft and said driving part thereof formed as a drum with means for fluid admission thereinto and with a second speed clutch drum gear secured for rotation therewith, a high speed fluid clutch having driving and driven parts with said driven part thereof secured for rotation with said driven shaft and said driving part thereof formed as a drum with means for fluid admission thereinto and with a direct mechanical driving connection with said intermediate shaft, means for driving said fluid clutch gears by said intermediate shaft, and means for selectively supplying fluid to said three fluid clutches and for draining fluid from each of said clutches when said fluid supply is connected for supplying fluid to another of said clutches, said selective fluid supply being operable in response to vacuum pressure of the fuel supply to the prime mover for said power transmission as controlled by the throttle position thereof.

23. A power transmission mechanism including a drive shaft having a splined end, a main driving gear having an axially slidable splined engagement with said shaft splined end, a driven shaft, an intermediate shaft rotatably mounted on said drive and driven shafts, a casing around said power transmission mechanism, a plurality of idler gears rotatably mounted on said casing, an intermediate shaft driving gear mounted on said intermediate shaft for driving rotation therewith and having a permanently geared engagement with said idler gears, a gear portion on said intermediate driving gear of the same diameter and gear pitch as said main driving gear, means including a shiftable member having a part arranged in axial slidable engagement with said main driving gear and another part adapted to provide a driving engagement with said idler gears for selectively driving said intermediate shaft by engagement with said intermediate driving gear and said idler gears, a forward friction clutch member on said intermediate driving gear, a second forward friction clutch member on said main driving gear, a third friction clutch member on said idler gears, a fourth friction clutch member for said selector gear member, means including a shifter member for manually shifting said shiftable member to provide a driving engagement first between said forward friction clutch members to drive said intermediate driving gear for forward drives and subsequently to provide a direct mechanical driving engagement between said main and intermediate driving gears through said shiftable member for forward drive of said intermediate shaft and alternately to provide a driving engagement first between said third and fourth friction clutch members to drive said intermediate driving gear through said idlers and subsequently to provide a mechanical drive between said main and intermediate driving gears through a gear reduction by engagement of said selector gear member and idler gears, a low speed fluid clutch having driving and driven parts with said driven part thereof secured for rotation with said driven shaft and said driving part thereof formed as a drum with fluid admission passages therethrough and with a low speed clutch drum gear secured for rotation therewith, a second speed fluid clutch having driving and driven parts with said driven part thereof secured for rotation with said driven shaft and said driving part thereof formed as a drum with fluid admission passages therethrough and with a second speed clutch drum gear secured for rotation therewith, a high speed fluid clutch having driving and driven parts with said driven part thereof secured for rotation with said driven shaft and said driving part thereof formed as a drum with fluid admission passages therethrough and with a direct mechanical driving connection with said intermediate shaft, a gear nest driving gear mounted on said intermediate shaft for rotation therewith, a plurality of nested gear supporting shafts mounted for rotation with said driven shaft, a nest shaft driving gear mounted for rotation with each of said nest shafts and arranged in geared driving engagement with said nest driving gear, a low speed driven nest gear mounted for rotation with each of said nest shafts and arranged in driving engagement with said low speed clutch driving gear, a second speed driven nest gear mounted for rotation with each of said nest shafts arranged in driving engagement with said second speed clutch driving gear, and means including fluid pumps driven by said drive shaft for selectively supplying fluid to said three fluid clutches and for draining fluid from each of said clutches when said fluid supply is connected for supplying fluid to another of said clutches, said selective fluid supply being operable in response to vacuum pressure of the fuel supply to the prime mover for said power transmission as controlled by the throttle position thereof.

STEPHEN WAYTO.

REFERENCES CITED

The following references are of record in the file of this patent:

UNITED STATES PATENTS

| Number | Name | Date |
|---|---|---|
| 1,242,974 | Pinckney | Oct. 16, 1917 |
| 1,848,615 | Fottinger | Mar. 8, 1932 |
| 1,910,696 | Kiep | May 23, 1933 |
| 1,962,972 | Stock | June 12, 1934 |
| 2,014,944 | Martyrer et al. | Sept. 17, 1935 |
| 2,021,526 | Stock | Nov. 19, 1935 |
| 2,063,471 | Stedefeld | Dec. 8, 1936 |
| 2,081,689 | Tyler | May 25, 1937 |
| 2,084,522 | Cotal | June 22, 1937 |
| 2,146,717 | Berger | Feb. 14, 1939 |
| 2,150,150 | Burrows | Mar. 14, 1939 |
| 2,193,891 | Thoma | Apr. 30, 1940 |
| 2,213,349 | Seibold | Sept. 3, 1940 |
| 2,236,631 | Thomas | Apr. 1, 1941 |
| 2,296,520 | Griswold | Sept. 22, 1942 |
| 2,423,820 | Baumann | July 15, 1947 |

FOREIGN PATENTS

| Number | Country | Date |
|---|---|---|
| 414,979 | Great Britain | Aug. 16, 1934 |